United States Patent [19]
Nakanishi et al.

[11] Patent Number: 5,242,743
[45] Date of Patent: Sep. 7, 1993

[54] FIBER REINFORCED RUBBER

[75] Inventors: Yasuyuki Nakanishi; Susumu Onoe; Toru Kusakabe; Hiroshi Matsuoka, all of Kobe, Japan

[73] Assignee: Bando Chemical Industries, Ltd., Kobe, Japan

[21] Appl. No.: 657,825

[22] Filed: Feb. 20, 1991

[30] Foreign Application Priority Data

Feb. 23, 1990 [JP] Japan .................. 2-43350

[51] Int. Cl.$^5$ .............................. B32B 5/02
[52] U.S. Cl. ........................ 428/222; 428/255; 428/257; 428/224; 428/34.5; 428/36.2; 428/109; 156/138; 156/139; 156/140; 156/141; 474/26; 474/263; 474/268; 474/205; 57/204; 57/902; 87/6; 87/9; 87/10; 87/11
[58] Field of Search ............ 428/36.3, 161, 222, 428/255, 257, 34.5, 36.2; 474/26, 263, 268, 205; 57/204, 902; 156/138-141; 87/6

[56] References Cited

U.S. PATENT DOCUMENTS

| | | | |
|---|---|---|---|
| 3,989,868 | 11/1976 | Bell et al. | 428/161 |
| 4,276,908 | 7/1981 | Horne | 428/36.3 |
| 5,160,301 | 11/1992 | Nakanishi et al. | 474/263 |

OTHER PUBLICATIONS

Utility Model Registration Application Laid Publication No. 60-172041 (Abstract only).
Patent Application Laid Publication No. 61-75855 (Abstract only).

*Primary Examiner*—Patrick J. Ryan
*Assistant Examiner*—Richard C. Weisberger
*Attorney, Agent, or Firm*—Wenderoth, Lind & Ponack

[57] ABSTRACT

A rubber having fiber reinforcement embedded thereon. The reinforcement comprises a cylindrically braided cords of more than four and even numbered twisted yarns. Yarns are right twist oriented and left twist oriented and they are twisted in the reverse direction in an, S-twist and a Z-twist.

10 Claims, 2 Drawing Sheets

FIBER REINFORCED RUBBER

BACKGROUND OF THE INVENTION

The present invention relates to a fiber reinforced rubber, particularly, a reinforcement embedded in a rubber.

Since high tensile strength, high elasticity, high dimensional stability, and high adhesive strength has been required for rubbers such as a belt, a tire, and a hose, a reinforcing cord constructed by fibers or a reinforcing canvas is embedded in a rubber. Generally, a cord of twisted yarns is used for the reinforcement. The yarn may be all twisted, only half of them twisted, or lang lay. The yarns, all of them twisted, are most popular for reinforcement for a rubber.

However, monofilaments rub each other with sharp angles in a part of the rubber which is reinforced by all of the twisted yarn and accordingly, the yarn is worn out, broken, or decreased in tensile strength from the rubbed parts thereof after a short period of usage. Therefore, the flex fatigue is lowered.

Japanese Patent Application Laid Open Gazette No. 59-19744 proposed a fiber reinforced rubber, which reinforcement is constructed by cords in which half of the yarns are twisted, or a lang lay to solve the above problems (flex fatigue).

However, a rubber reinforced by cords of only half yarns are twisted or the lang lay is lowered in elongation and the rate of the tensile elasticity after the dipping process, compared with a rubber reinforced by cords in which all yarns are twisted. This results in a lower dimensional stability.

On the other hand, a braided cord has been made for various purposes. A cylindrically braided cord which needs more than four and even numbered yarns to make a cylindrical configuration surpasses a twisted cord in flex fatigue and dimensional stability due to its constructional characteristics. Therefore, a cylindrically braided cord will improve both the flex fatigue resistance and dimensional stability when used for the reinforcement of rubber.

Moreover, in case that the cylindrically braided cord is used for the reinforcement of a rubber, if the yarns constructing the cord are twisted, the cord is arranged orderly and consequently, a higher strength of the cylindrically braided cord and a longer service life of the rubber is expected. If in all the yarns, the right twist oriented and the left twist oriented, are twisted in the same direction, the cylindrically braided cord may possess a direction and rubber reinforced by such a cylindrically braided cord possessing such a direction may not obtain satisfactory results in flex fatigue resistance.

SUMMARY OF THE INVENTION

The object of the present invention is to use a cylindrically braided cord instead of a twisted cord for a reinforcement and to specify the direction of the yarns so as to provide a rubber with high flex fatigue, dimensional stability, and a longer service life.

In order to achieve the above objects, according to the present invention, the reinforcement embedded in a rubber is constructed by a cylindrically braided cord composed of more than four and even numbered yarns. That is, right twist oriented yarns and left twist oriented yarns, are turned in the reverse direction each to other in an, S-twist and a Z-twist.

DESCRIPTION OF THE PREFERRED EMBODIMENT

A preferred embodiment will be described below with reference to the accompanying drawings.

Figure 4:
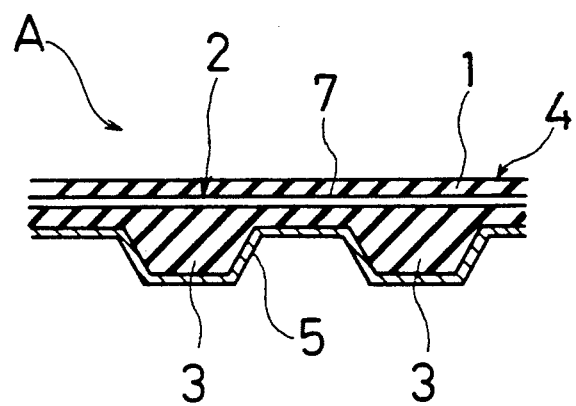
FIG. 4 is an enlarged vertical front section of a toothed belt.

FIG. 4 illustrates a toothed belt A as a fiber reinforced rubber. The toothed belt A comprises a belt base 4 having an stretching rubber ply 1 and a plurality of teeth 3 formed over one side thereon (underside of the belt base in FIG. 4) and made of the same material, a rubber, as the stretching rubber ply 1 (only two teeth are shown in FIG. 4). A fiber reinforcement 2 is embedded on the stretching rubber ply 1 of the belt base 4. A canvas layer 5 is adhered to a surface of teeth 3 of the belt base 4.

Figure 1:
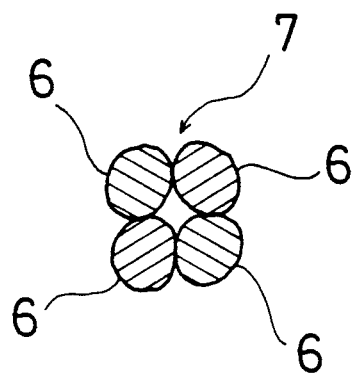
FIG. 1 is an enlarged side section of a cylindrically braided cord.
Figure 3:
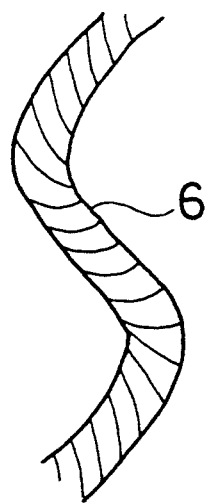
FIG. 3 is an enlarged view of a yarn twisted to the right.
Figure 2:
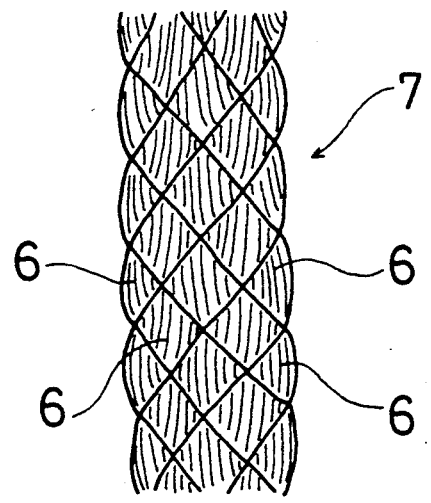
FIG. 2 is an enlarged vertical front section of a cylindrically braided cord.

The present invention is characterized in that the reinforcement 2, as enlargely shown in FIGS. 1 and 3, is constructed by cylindrically braided cords 7 of more than four and even numbered yarns 6 (four yarns in the present embodiment) which yarns are right twist oriented and left twist oriented and twisted in the reverse direction, such as an S-twist and a Z-twist.

The yarn 6 may be an inorganic fiber, an organic fiber, or a metallic fiber. Further, a sort or long spun yarn or combination of those can be used for the yarn 6 according to the required performance of the toothed belt A. Also, the number of yarns 6 can be any even numbers if it is more than 4. In order to make a cord of cylindrical configuration, more than four and even numbered yarns are required. An industrial braiding machine cannot make a cord of a cylindrical configuration by using odd numbered yarns when yarns of the same denier number are used. Also, the total denier number and the number of monofilaments may vary according to the required performance of the toothed belt A. The error of the number of twists of the S-twist and Z-twist is set within ±20%. When the all twisted yarns or lang lay are used for the yarns 6, the twisting direction and the number of twists refer to the final twists.

The cylindrically braided cord 7 are subjected to an adhesive process, whereby the cord is soaked with an adhesive combined with an epoxy resin, an isocyanate compound, an ethylene urea compound, and a resorcin formalin latex (RFL), etc. and subjected to a stretching step before it is embedded in the stretching rubber ply 1. A dipping process is preferably used in the adhesive step in order to soak the adhesive evenly from the surface to the inside of the cord.

The result of a flex fatigue test is shown in Table 1, comparing the above constructed toothed belt A with a comparable example. The numerals of Table 1 show the tensile strength of the belt for the present embodiment and a comparable example.

TOOTHED BELT A ACCORDING TO THE PRESENT INVENTION

Four 1500 de (the number of total denier is 6000 de) Kevlar (product of DuPont) composed of aramid fibers are used for a cylindrically braided cord 7 constructing a reinforcement 2.

The right twist oriented is twisted 20 times per 10 cm in an S-twist and the left twist oriented is twisted 20 times per 10 cm in a Z-twist. In other words, the cylindrically braided cord 7 braided by four yarns, right twist oriented and left twist oriented, twisted in the reverse direction, S-twist and Z-twist, are used for the reinforcement 2. The cylindrically braided cord 7 is dipped into the isocyante compound so as to form a sub-coat ply, then it is dipped into the adhesive combination liquid of a resorcin formalin latex (RFL) so as to form a second-coat ply. Further, it is dipped into chloroprene rubber so as to form a top-coat ply, and finally a stretching process is carried out with 1 g/de tension. The toothed belt A, wherein the reinforcement 2 composed of a plurality of the cylindrically braided cords 7 is embedded on the belt base 4 is obtained in the following steps: a plurality of cylindrically braided cords 7 finished the stretching process is placed spirally on the stretching rubber ply 1 of the chloroprene rubber, and the teeth 3 of the chloroprene rubber is formed on it so that the cylindrically braided cord 7 is embedded thereon. Thereafter, the nylon cloth 5 is adhered to the surface of teeth 3 and the rubber is cured. The adhesive is soaked evenly from the surface to the inside of the cylindrically braided cord 7 during the adhesive process.

TOOTHED BELT OF COMPARABLE EXAMPLE

The right twist oriented and left twist oriented yarns are all twisted 20 times per 10 cm in a Z-twist. Other features are the same as the belt of the present invention.

TEST ON FLEX FATIGUE

Figure 5:
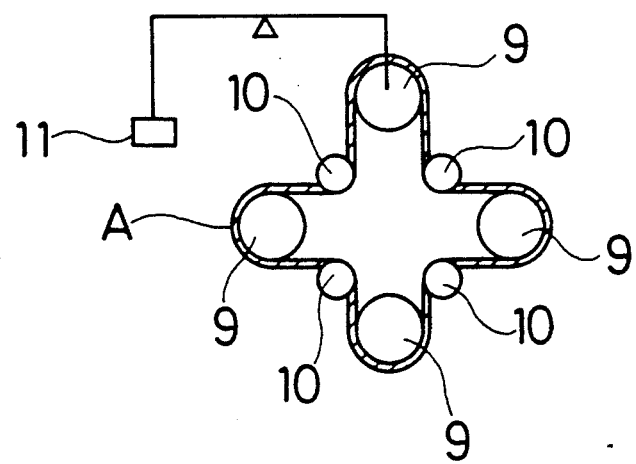
FIG. 5 is an explanatory drawing of the testing system for a flex fatigue.

The test was carried out by the system shown in FIG. 5, where the toothed belt A is wound around four large pulleys 9 and four small pulleys 10 disposed between large pulleys 9, and a predetermined tension is applied to the toothed belt A by a weight 11. The above small pulleys 10 are 30 mm in diameter. One cycle is defined the toothed belt A goes through all the four small pulleys 10, i.e., the number of belt flex by the small pulleys 10 is four.

TABLE 1

|  | Belt Flex Number | | |
| --- | --- | --- | --- |
|  | $1 \times 10^6$ | $1 \times 10^7$ | $1 \times 10^8$ |
| Present Embodiment | 90.0% | 85.4% | 80.3% |
| Comparable example | 80.8% | 74.9% | 69.5% |

As shown in the test data on table 1, for example, at the belt flex number $1 \times 10^8$, the maintainability of the tensile strength of the belt of the present invention is 80.3%, which is very little decrease in the tensile strength. However, the maintainability of the tensile strength of the belt of the comparable example is 69.5%, which is great decrease in tensile strength. This large difference between the two belts results from, in this embodiment, the fact that the right twist oriented and left twist oriented yarns constructing the cylindrically braided cord 7 are twisted in the reverse direction by means of an, S-twist and a Z-twist and therefore, the direction of the yarns is offset.

As shown in the above, in this embodiment, the reinforcement 2 is constructed by the cylindrically braided cords 7 which is made of more than four and even numbered yarns 6. The yarns 6 are right twist oriented and left twist oriented and twisted in the reverse direction from each other in an, S-twist and Z-twist. Therefore, an even stress is applied to the monofilaments composing the yarns 6 as the structual characteristic of the cylindrically braided cord 7 and the direction of the yarns is offset by the S-twist and Z-twist. This results in a higher flex fatigue and a longer service life of the toothed belt A. Moreover, the dimensional stability of the toothed belt A is improved in the present embodiment than in the twisted cord due to the structural characteristic of the cylindrically braided cord 7.

In the above embodiment, if a center cord is provided inside a hollow part of the cylindrically braided cord 7, the dimensional stability, in addition to the flex fatigue, will be improved.

Moreover, in the present embodiment, the toothed belt A is shown as the rubber. However, the belt is not limited to the toothed belt A, but covers an industrial belt such as a conveyor belt and a transmission belt like a flat belt and a ribbed belt. The present invention also can be applied to rubbers other than belts, for example, tires and hoses.

What is claimed is:

1. A fiber reinforce rubber having a fiber reinforcement embedded thereon, said reinforcement comprising a cylindrically braided cord composed of more than four and even numbered yarns, said yarns being right twist oriented in an S-twist and left twist oriented in a Z-twist, and twisted in the reverse direction from each other.

2. A fiber reinforced rubber claimed as claim 1, wherein said cylindrically braided cord is composed of yarns of inorganic fibers.

3. A fiber reinforced rubber claimed as claim 1, wherein said cylindrically braided cord is composed of yarns of organic fibers.

4. A fiber reinforced rubber claimed as claim 3, wherein said organic fibers of said yarns are aramid fibers.

5. A fiber reinforced rubber claimed as claim 1, wherein said cylindrically braided cord is composed of yarns of metallic fibers.

6. A fiber reinforced rubber claimed as claim 1, wherein a center cord is provided inside a hollow part of said cylindrically braided cord.

7. A fiber reinforced rubber claimed as claim 1, which is a transmission belt.

8. A fiber reinforced rubber claimed as claim 7 in which said transmission belt is a toothed belt comprising a belt base including a stretching rubber ply comprising part of the fiber reinforced rubber and having a plurality of teeth integrally formed on one side of said belt base and made of the same material as said stretching rubber ply, and a fiber reinforcement embedded in said stretching rubber ply made of the cylindrically braided cord of claim 1.

9. A fiber reinforced rubber claimed as claim 1, which is a conveyor belt.

10. A fiber reinforced rubber claimed as claim 1, which is a hose.

* * * * *